United States Patent
Dobschal et al.

(10) Patent No.: US 9,465,218 B2
(45) Date of Patent: Oct. 11, 2016

(54) DISPLAY DEVICE COMPRISING MULTIFUNCTION GLASS, PRODUCTION METHOD AND OPTICAL ELEMENT HAVING A FRESNEL STRUCTURE

(71) Applicant: Carl Zeiss AG, Oberkochen (DE)

(72) Inventors: Hans-Juergen Dobschal, Kleinromstedt (DE); Guenter Rudolph, Jena (DE); Karsten Lindig, Erfurt (DE)

(73) Assignee: Carl Zeiss AG, Oberkochen (DE)

( * ) Notice: Subject to any disclaimer, the term of this patent is extended or adjusted under 35 U.S.C. 154(b) by 65 days.

(21) Appl. No.: 14/613,046

(22) Filed: Feb. 3, 2015

(65) Prior Publication Data
US 2016/0223815 A1    Aug. 4, 2016

Related U.S. Application Data

(63) Continuation of application No. 14/252,239, filed on Apr. 14, 2014, now Pat. No. 8,970,961, which is a continuation of application No. 13/895,049, filed on May 15, 2013, now Pat. No. 8,736,962, which is a continuation of application No. 13/203,203, filed as application No. PCT/EP2010/052426 on Feb. 25, 2010, now Pat. No. 8,467,132.

(30) Foreign Application Priority Data

Feb. 25, 2009    (DE) .................. 10 2009 010 538

(51) Int. Cl.
| | |
|---|---|
| *G02B 27/14* | (2006.01) |
| *G09G 5/00* | (2006.01) |
| *G03B 21/00* | (2006.01) |

(Continued)

(52) U.S. Cl.
CPC .......... *G02B 27/0172* (2013.01); *C03B 11/08* (2013.01); *C03B 19/02* (2013.01); *C03C 17/001* (2013.01)

(58) Field of Classification Search
CPC .......... G02B 27/0172; G02B 27/0101; G02B 27/0149; G02B 27/145; G02B 27/0103; G02B 27/01; G03B 21/00; G03B 21/14; A61B 3/103; A61B 3/14; A61B 3/113; A61B 3/1225; G09F 19/18; G09G 3/003
USPC ...... 359/630–634, 13–14; 349/11; 310/49 R, 310/156.32, 156.33, 156.34, 156.35, 310/266–268, 156.02; 353/11–12, 28, 119; 345/7, 9; 340/438, 980, 995.1, 815.47, 340/815.74; 351/200, 205–206, 210, 221
See application file for complete search history.

(56) References Cited

U.S. PATENT DOCUMENTS

| | | |
|---|---|---|
| 4,220,400 A | 9/1980 | Vizenor |
| 4,510,560 A | 4/1985 | Negishi |

(Continued)

*Primary Examiner* — Dawayne A Pinkney
(74) *Attorney, Agent, or Firm* — Patterson Thuente Pedersen, P.A.

(57) ABSTRACT

A multifunction optical element including an image generating module that generates an image, and couples the image into a multifunction glass that has a coupling in area and a coupling out area. The image produced is coupled into the multifunction glass via the coupling in area, guided in the multifunction glass to the coupling in area, and coupled out via the coupling out area, in such a way that the user can perceive the coupled out image superimposed on the surroundings when the holding device is placed on the head of the user. The coupling out area has a Fresnel structure which receives light from the coupling-in-area via a folded beam path and couples the image out of the multifunction optical element. The coupling out element has an imaging property.

20 Claims, 17 Drawing Sheets

(51) Int. Cl.
  *G02F 1/1335* (2006.01)
  *G02B 27/01* (2006.01)
  *C03B 19/02* (2006.01)
  *C03B 11/08* (2006.01)
  *C03C 17/00* (2006.01)

(56) References Cited

U.S. PATENT DOCUMENTS

| | | |
|---|---|---|
| 5,369,415 A | 11/1994 | Richard |
| 6,124,989 A | 9/2000 | Oode et al. |
| 6,204,974 B1 | 3/2001 | Spitzer |
| 6,825,987 B2 | 11/2004 | Repetto et al. |
| 6,924,943 B2 | 8/2005 | Minano et al. |
| 6,989,929 B2 | 1/2006 | Watanabe |
| 7,178,947 B2 | 2/2007 | Marks |
| 7,577,326 B2 | 8/2009 | Amitai |
| 7,656,585 B1 | 2/2010 | Powell et al. |
| 8,456,744 B2 | 6/2013 | Dobschal et al. |
| 8,467,132 B2 | 6/2013 | Dobschal et al. |
| 8,736,962 B2 | 5/2014 | Dobschal et al. |
| 2001/0024329 A1 | 9/2001 | Dreistein |
| 2002/0186179 A1 | 12/2002 | Knowles |
| 2003/0053206 A1 | 3/2003 | Togino |
| 2003/0063356 A1 | 4/2003 | Kobayashi |
| 2004/0085649 A1 | 5/2004 | Repetto |
| 2007/0008624 A1 | 1/2007 | Hiayama |
| 2007/0109619 A1 | 5/2007 | Eberl |
| 2007/0285773 A1 | 12/2007 | Ogawa |
| 2008/0151379 A1 | 6/2008 | Amitai |
| 2009/0213608 A1 | 8/2009 | Mozaffari-Afshar et al. |

DISPLAY DEVICE COMPRISING MULTIFUNCTION GLASS, PRODUCTION METHOD AND OPTICAL ELEMENT HAVING A FRESNEL STRUCTURE

RELATED APPLICATION

This application is a continuation of application Ser. No. 14/252,239, filed Apr. 14, 2014, which in turn is a continuation of application Ser. No. 13/895,049, filed May 15, 2013, now U.S. Pat. No. 8,736,962, issued May 27, 2014, which in turn is a continuation of application Ser. No. 13/203,203, filed Sep. 22, 2011, now U.S. Pat. No. 8,467,132, issued Jun. 18, 2013, which is a National Phase entry of PCT Application No. PCT/EP2010/052426, filed Feb. 25, 2010, which claims priority to German Application Number 102009010538.7, filed Feb. 25, 2009, each of which is hereby fully incorporated herein by reference.

FIELD OF THE INVENTION

The present invention relates to a display device including a holding device that can be worn on the head of a user and an image-generating module which generates an image and is attached to the holding device and a method for producing a multifunction glass of such a display device as well as an optical element having an optically effective surface which at least in part has a Fresnel structure with several Fresnel segments.

BACKGROUND OF THE INVENTION

An optical element with a Fresnel structure is often used to reduce installation space, for example in the case of illumination lens systems. In this case, e.g. rotationally symmetric Fresnel structures as well as toric Fresnel structures are used.

A rotationally symmetric Fresnel lens which is used in transmission for light reflection and optical imaging in back projection devices is known from U.S. Pat. No. 6,989,992 B2. A rotationally symmetric Fresnel lens working in reflection and having concave Fresnel structures which is used in an illumination lens system is known from U.S. Pat. No. 7,178,947 B2. A Fresnel structure working in reflection which serves to shape rays and starting from a cylindrical profile shape is further known from U.S. Pat. No. 4,510,560.

SUMMARY OF THE INVENTION

With display devices according to the type named at the beginning, the problem often arises of coupling the generated image into the multifunction glass such that it is guided in the latter to the coupling-out area without disruptive image errors occurring.

Starting from this, the object of the invention is to improve the display device of the type named at the beginning such that the coupling-in takes place such that disruptive image errors are avoided as far as possible. Furthermore, a production method for a multifunction glass of such a display device is to be provided.

The object is achieved in the case of a display device of the type named at the beginning in that the coupling-in area comprises a Fresnel structure which brings about a folding of the beam path during the coupling of the image into the multifunction glass and has an imaging property.

The coupling-in can thus be carried out such that the image is guided in the multifunction glass to the coupling-out area (for example by total internal reflection). Furthermore, disruptive image errors can be effectively countered by means of the imaging property.

The Fresnel structure can be formed in particular at a material boundary surface of the multifunction glass, wherein the material boundary surface is in particular a curved material boundary surface. A great freedom of design for the multifunction glass is thus provided which is hardly or not at all limited by the necessary optical function of the coupling-in area, as the optical function of the coupling-in area is effected by means of the Fresnel structure.

The Fresnel structure can be formed transmissive or reflective. If it is formed transmissive, it is preferably formed on the material boundary surface of the multifunction glass facing the image-generating module. If the Fresnel structure is reflective, it is preferably formed on the material boundary surface of the multifunction glass facing away from the image-generating module.

The Fresnel structure can have several Fresnel segments, wherein the optically effective facets of the Fresnel segments optically correspond to an imaginary optical effective surface which is curved and has neither mirror symmetry nor rotational symmetry. Furthermore, the optical effective surface preferably also has no translational symmetry. With such an optical effective surface, the desired folding of the beam path, and the desired imaging property, can be realized even if the Fresnel structure is formed on a material boundary surface of the multifunction glass that is curved.

The maximum height of each facet is preferably the same in the case of the Fresnel structure. It lies, for example, in the range of 5-500 µm, in another example in the range of 0.01-0.1 mm. A range of 200-300 µm and a range of 0.05-0.3 mm are used in another example embodiment.

The facet shape can be an approximation, in particular a linear approximation to the shape of the corresponding surface section of the imaginary effective surface. In particular, the facets can be concave or convex in cross-section.

The Fresnel segments can be directly neighbouring, as is the case with a "standard" Fresnel structure. However, is it possible that the Fresnel segments are spaced apart from each other, wherein the normal course of the material boundary surface is then present between them.

A method for producing a multifunction glass of a display device according to the invention is furthermore provided in which a Fresnel structure which has an imaging property as well as a folding property for the beam path is formed in the coupling-in area of the multifunction glass.

With this method, a multifunction glass for the display device according to the invention and thus also the display device according to the invention itself can be easily produced.

In the production method, the Fresnel structure can be formed on a curved material boundary surface of the multifunction glass. Thus, a coupling of the design of the multifunction glass itself (of its shape and curvature) can virtually be carried out by its coupling-in area. As soon as the shape of the multifunction glass is fixed, the Fresnel structure for the coupling-in area can be calculated and manufactured.

In the method, the Fresnel structure can have several Fresnel segments, wherein the optically effective facets of the Fresnel segments are formed such that they optically correspond to an imaginary optical effective surface which is curved and has neither mirror nor rotational symmetry. In particular, the optical active surface also has no translational symmetry.

In the production method according to the invention, the multifunction glass can be produced on the basis of production data which are generated computationally by dividing an optical model surface into several height regions and computationally arranging the surface sections of the individual height regions or approximation of these surface sections at a base surface such that they optically correspond to the optical effective surface. The division into the several height regions can take place at a constant height or also at varying heights. In particular, the height lies in the range of 5-500 μm as well as in the range of 0.01-0.1 mm. A range of 200-300 μm and a range of 0.05-0.3 mm are particularly preferred.

The height regions can in particular be chosen such that the distance to the base surface is constant in each case.

The surface sections or the approximation of the surface sections can be arranged computationally at a flat or at a curved base surface. In particular, the arrangement of a curved base surface is advantageous, as in this case the material boundary surface of the multifunction glass can also be curved. A linear approximation is carried out in particular as approximation of the surface sections. However, any other type of approximation is also possible.

The facets can be formed such that the maximum height of all the facets is the same.

In particular, the production method according to the invention can be developed such that the multifunction glass of the display device according to the invention (including all developments) can be produced.

Furthermore, an optical element with an optically effective surface which at least in part has a Fresnel structure with several Fresnel segments is provided, wherein the optically effective facets of the Fresnel segments optically correspond to an imaginary optical effective surface which is curved and have no mirror or rotational symmetry.

The optical element can thus be used in widely different fields. In particular, the optical element can be formed as a multifunction glass of the display device according to the invention.

Such an optical effective surface which has neither mirror nor rotational symmetry and is also called free-form surface in the following can initially be computationally optimized independently of its spatial extent, in order that the then-manufactured optical element with the Fresnel structure has the desired properties. The spatial extent of the free-form surface plays no role in practice in the implementation of the free-form surface as a Fresnel structure, as it can be provided in an optically equivalent manner by the individual facets, with the result that the above-mentioned computational optimization can be carried out.

The maximum facet height can be predetermined and for example lie in the range of 5-500 μm, in particular in the range of 0.01-0.1 mm. A range of 200-300 μm and a range of 0.05-0.3 mm are particularly preferred.

The optical effective surface preferably also has no translational symmetry.

In particular, the optically effective surface is a boundary surface of the optical element. This facilitates the production of the optical element. Thus, it can for example be produced by diamond milling. However, it is also possible to produce the optical element by moulding and casting methods.

The Fresnel segments can be formed as reflective or as refractive segments. In the case of reflective formation, the reflectivity can be adjusted and lie in a range of from more than 0 to almost 100%.

In particular, the maximum height of each facet in the case of the optical element can be the same.

Furthermore, the facet shape can be an approximation, in particular a linear approximation to the shape of the corresponding surface section of the imaginary effective surface. Thus, an optically corresponding action can still always be achieved. Of course, the optical action of the Fresnel structure is in reality not identical to the optical action of the imaginary optical effective surface. According to the invention, it is essential that the deviation of the actual optical action of the Fresnel structure from the optimum optical action of the imaginary optical effective surface is so small that the optical element meets the optical requirements set, as is always the case with optical elements, which in reality never achieve the theoretical maximum optical action.

The facets can be curved concavely or also convexly in cross-section.

Furthermore, the Fresnel segments can be directly neighbouring. However, it is also possible that individual Fresnel segments are spaced apart from each other.

The optically effective surface with the Fresnel structure is in particular a continuous surface.

Furthermore, a method for producing the optical element with an optically effective surface which at least in part has a Fresnel structure with several Fresnel segments is provided, in which the optically effective facets of the Fresnel segments are formed such that they optically correspond to an imaginary optical effective surface which is curved and has no mirror or rotational symmetry.

With this production method, an optical element with excellent optical properties can be produced.

The optical effective surface can also in particular have no translational symmetry.

The Fresnel segments are preferably formed at a boundary surface of the optical element. This simplifies the production of the optical element.

The optical element can be produced on the basis of production data which are generated computationally by dividing an optical model surface into several height regions and computationally arranging the surface sections of the individual height regions or approximations of these surface sections at a base surface (e.g. on or under the base surface) such that they optically correspond to the optical effective surface. The division into the several height regions can take place at a constant height or also at varying heights. In particular, the height lies in the range of 5-500 μm or in the range of 0.01-0.1 mm. A range of 200-300 μm and a range of 0.05-0.3 mm are particularly preferred.

The height regions can in particular be chosen such that the distance to the base surface is constant in each case.

The surface sections or the approximation of the surface sections can be arranged computationally at a flat or at a curved base surface.

In particular, a linear approximation can be chosen as an approximation of the surface sections. However, any other type of approximation is also possible.

The facets can be formed such that the maximum height of all the facets is the same.

In particular, the production method according to the invention can be developed such that the optical element according to the invention and its developments can be produced.

The optical element can be used for example as a beam splitter or also as a beam combiner. Furthermore, the optical element can be used as a deflecting element. It is also possible to form the optical element as an imaging element that operates reflectively or refractively. Further possible designs are given in the following embodiments. The optical element can thus also be used in the field of HMD (Head Mounted Display) devices.

It is understood that the features mentioned above and those yet to be explained in the following are applicable, not only in the given combinations, but also in other combinations or singly, without departure from the scope of the present invention.

BRIEF DESCRIPTION OF THE DRAWINGS

The invention is explained in further detail below by way of example using the attached drawings which also disclose features essential to the invention. There are shown in.

DETAILED DESCRIPTION OF THE DRAWINGS

Figure 1:
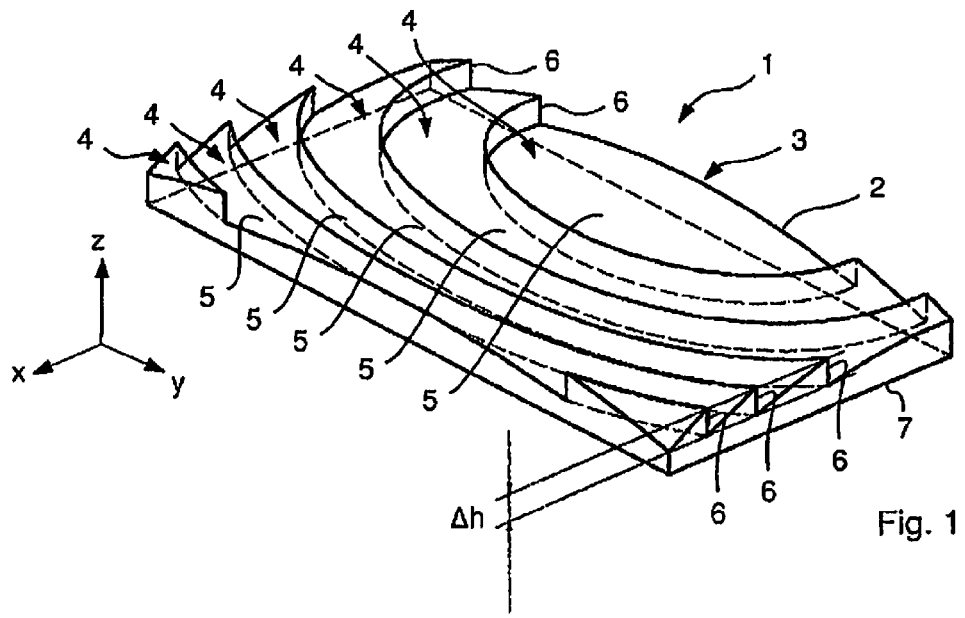
FIG. 1 is a perspective view of a first embodiment of the optical element according to the invention.

In the embodiment shown in FIG. 1, the optical element 1 according to the invention, which is here formed as a lens, comprises on its top side 2 a Fresnel structure 3 with several Fresnel segments 4.

Each Fresnel segment 4 has an optically effective facet 5. In order to achieve the stepped shape shown in FIG. 1, each Fresnel segment 4 normally also comprises an edge 6 which here extends essentially perpendicular to the underside 7 of the optical element 1.

Figure 2:
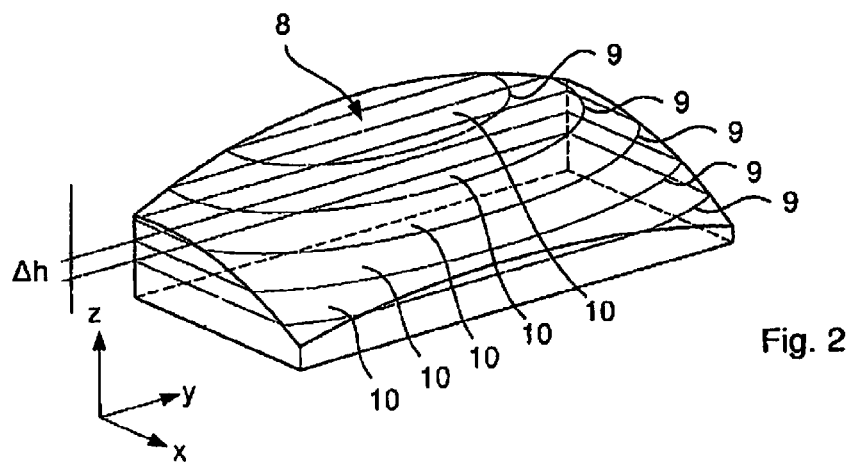
FIG. 2 depicts the course of the optical effective surface which is simulated by the Fresnel structure 3 according to FIG. 1.

The common optical action of the facets 5 corresponds to an imaginary optical effective surface 8, such as is shown in FIG. 2, wherein the optical effective surface 8 is curved and has no mirror or rotational symmetry. As can easily be seen from the comparison of FIGS. 1 and 2, the representation in FIG. 2 is rotated by 90° about the z-axis compared with the representation in FIG. 1. The imaginary optical effective surface 8 can be implemented as a Fresnel structure 3 according to FIG. 1 as follows.

Figure 3:
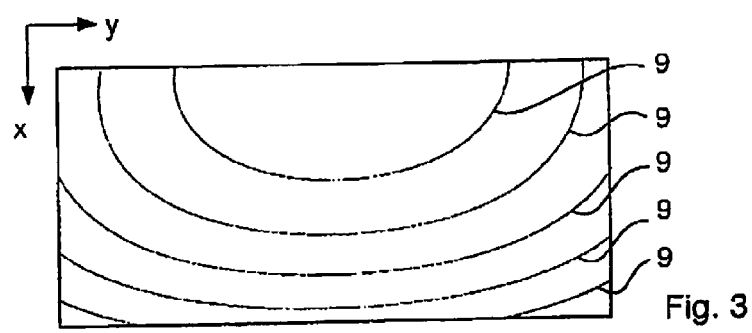
FIG. 3 is a top view of the optical element from FIG. 1.

The active surface 8 is divided in z-direction into sections of equal height $\Delta h$. Section lines 9 which can also be called contour lines and which each delimit a surface section 10 of the active surface 8 thereby result. The surface sections 10 are all shifted in z-direction towards each other such that in each case the lower section line (the one with the lower z-value) and thus the lower rim of the facet 5 lie at the same height (in z-direction). The perpendicular edge 6 is then guided from the respective upper section line of the surface sections 10 and thus the upper rim of the facet 5 to the lower section line of the directly neighbouring surface section 10, in order to arrive at the stepped formation of the Fresnel structure 3 according to FIG. 1. The upper rims are to be seen in the top view in FIG. 3 of the optical element 1 from FIG. 1.

The steps that are to be carried out in order to arrive at the desired Fresnel structure 3 from the imaginary optical effective surface 8 which is curved and does not have mirror or rotational symmetry are explained in detail below in conjunction with FIG. 4, in which an xz-section of the active surface 8 is shown which is different from the active surface 8 of FIG. 2, but again is curved and does not have mirror or rotational symmetry. The division into surface sections 10 (in the sectional representation of FIG. 4 these surface sections are of course line sections) of equal height is represented by the dotted section lines in FIG. 4.

Figure 5:
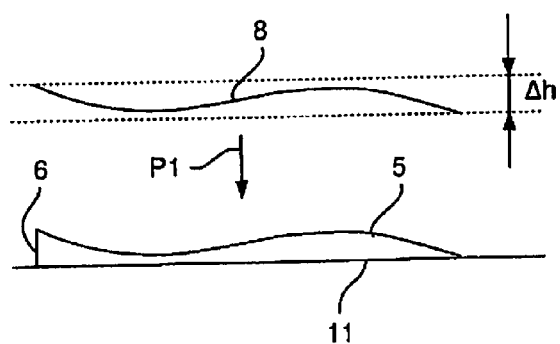
FIG. 5 is an enlarged representation of the detail C from FIG. 4.

It can be seen in the enlarged representation of the detail C in FIG. 5 that the surface section 10 shown is clearly defined on the basis of the predetermined distance $\Delta h$ and is then reduced to the height $z_0$, as is represented schematically by the arrow P1. Furthermore, the edge 6 which extends perpendicular to the height $z_0$ is also added on the left side of the surface element 10. Thus, a level base surface 11 on which the Fresnel structure 3 is formed lies at height $z_0$.

Thus, the following Formula 1 can be presented for the Fresnel structure 3, wherein $z_F$ describes the Fresnel structure 3, $z_{base\_surface}$ the surface shape of the base surface 11 (here a plane) on which the Fresnel structure is placed and $z_{facet}$ the Fresnel facets 5 relative to the base surface:

$$z_F = z_{base\_surface} + z_{facet} \quad (1).$$

The surface $z_{facet}$ of the facets, which can also be called "Fresnelled" free-form surface, is calculated according to the following Formula 2:

$$z_{facet} = \text{modulo}(z_{effective\_surface}, \Delta h) \quad (2),$$

wherein the effective surface 8 is described by the following surface formula $z_{effective\_surface}$ $$z_{effective\_surface}(x, y) = \quad (3)$$
$$K1 + K2 + b_{10}x + b_{01}y + b_{11}xy + b_{21}x^2y + b_{12}xy^2 + \sum_{\substack{i=2\\j=2}}^{\substack{N\\M}} b_{ij}x^iy^j,$$

in which K1 denotes the conical term in x-direction and K2 the conical term in y-direction, as is given below:

$$K1 = \frac{C_x x^2}{1 + \sqrt{1 - (1 + k_x)c^2 x^2}}, \quad (4)$$

$$K2 = \frac{C_y y^2}{1 + \sqrt{1 - (1 + k_y)c^2 y^2}}, \quad (5)$$

By applying the modulo function to the effective surface 8, the effective surface 8 is divided in z-direction into distances of equal height $\Delta h$. Thus, the maximum height of the facets 5 is $\Delta h$ in each case. The modulo function used is given below:

$$\text{modulo}(a, m) = a - \left\lfloor \frac{a}{m} \right\rfloor \cdot m, \quad (6)$$

wherein the Gaussian brackets $$\left\lfloor \frac{a}{m} \right\rfloor$$

denote the largest whole number that is smaller than or equal to the number in the Gaussian brackets, thus the result of the division a/m without the remainder of the division. The following formula thus results for the facet surfaces:

$$z_{facet} = \quad (7)$$
$$\text{modulo}(z_{effective\_surface}, h) = z_{effective\_surface} - \left\lfloor \frac{z_{effective\_surface}}{\Delta h} \right\rfloor \cdot \Delta h.$$

According to the above-described procedure, the corresponding Fresnel structure 3 which provides the corresponding optical action can be deduced on the basis of a desired optical effective surface 8 which is curved and has no mirror or rotational symmetry and is also called free-form surface 8 below. Although the same optical action that a lens whose base surface is formed according to the free-form surface 8 would have cannot be achieved with the Fresnel structure 3 because of the stepped shape, a comparable optical action is achieved.

Figure 4:
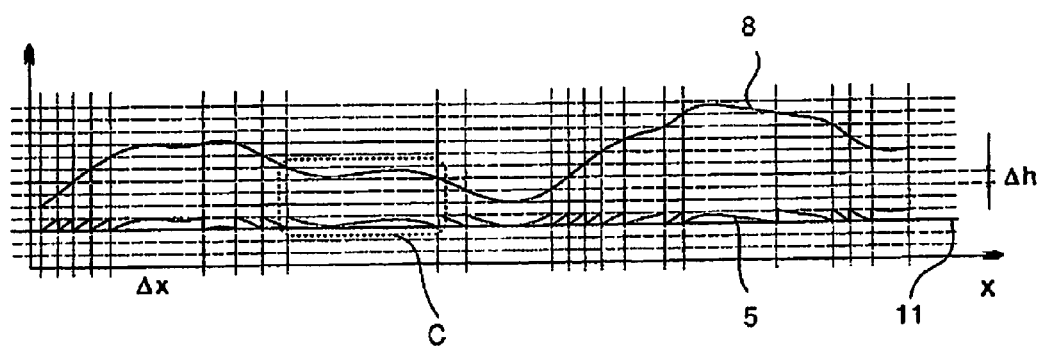
FIG. 4 is an xz section of the active surface 8.
Figure 6:
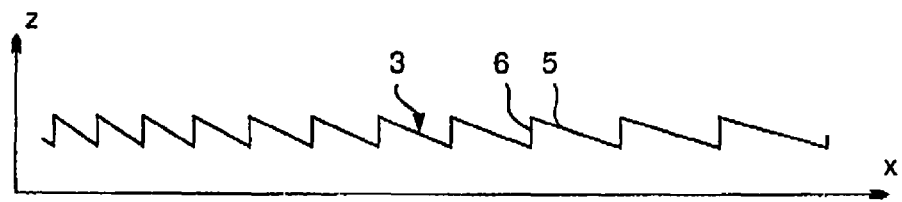
FIGS. 6-9 depict various profile shapes of the Fresnel structure 3 of the optical element 1 according to the invention.
Figure 7:
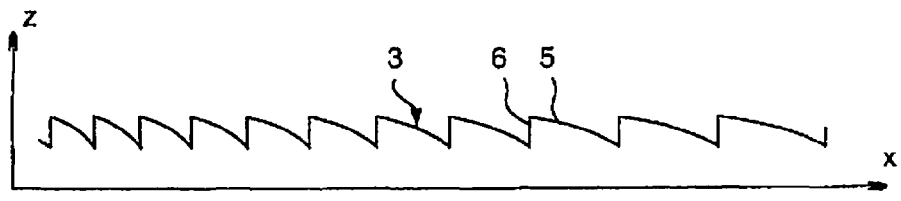
Figure 8:
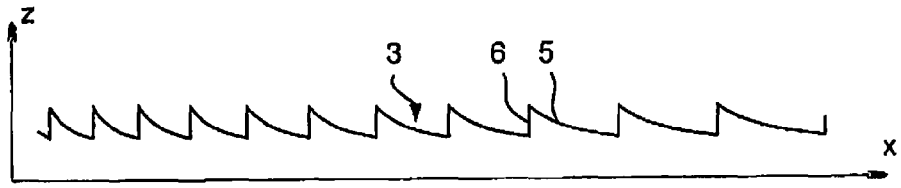
Figure 9:
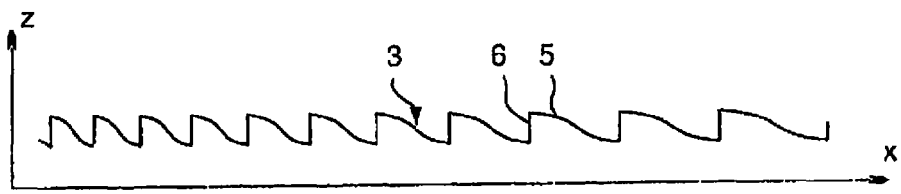

As can be seen from the representation in FIGS. 4 and 5, the facets 5 have the curvatures predetermined by the free-form surface 8 in the height region $\Delta h$. In order to simplify the production of the Fresnel structure 3, it is possible to approximate the course of the individual facets 5 to the corresponding surface shape of the free-form surfaces. In the simplest case, the course can be linearized, as is represented schematically in the sectional view of FIG. 6. However, it is also possible to provide the facets with a convex curvature (FIG. 7) or a concave curvature (FIG. 8). An approximation by another curvature course is also possible, as indicated for example in FIG. 9.

With this procedure according to the invention allowing any free-form surface 8 to be formed on a flat surface as a Fresnel structure, a design optimized in terms of installation space is possible for example.

Figure 10:
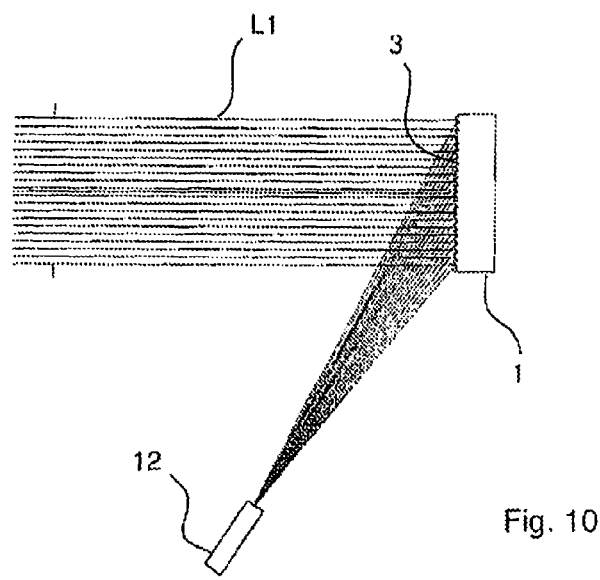
FIG. 10 depicts a further embodiment of the optical element 1 as a Fresnel mirror.

Thus for example a Fresnel mirror 1 can be produced such as is shown in FIG. 10. A parallel incident light beam L1 is reflected by means of the Fresnel mirror and simultaneously focussed onto a detector 12. The macroscopic extent of the Fresnel mirror 1 or the mirror surface is here perpendicular to the direction of incidence of the light beam L1. This is possible, as the desired deflection and focussing take place on the basis of the Fresnel structure 3.

Figure 11:
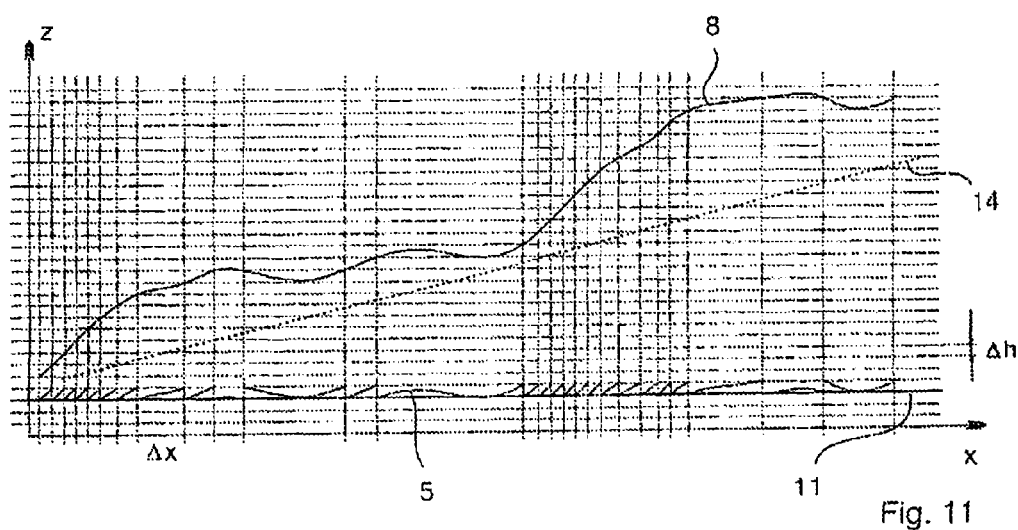
FIG. 11 is a sectional view to illustrate the implementation of a further free-form surface as a Fresnel structure 3.

The Fresnel structure 3 can be based for example on the free-form surface 8 shown in FIG. 11 in a sectional view. To illustrate the tilt of the free-form surface 8 relative to the base surface 11, a line of best fit 14 is drawn in. The formation of the Fresnel structure takes place in the same way as already described, with the result that the tilting of the free-form surface 8 is realized by the Fresnel structure 3 formed on the level base surface 11 or the facets 5 of the individual Fresnel segments 4. The facets 5 are metallized here, in order that the Fresnel structure 3 acts as a reflective Fresnel structure 3.

Figure 12:
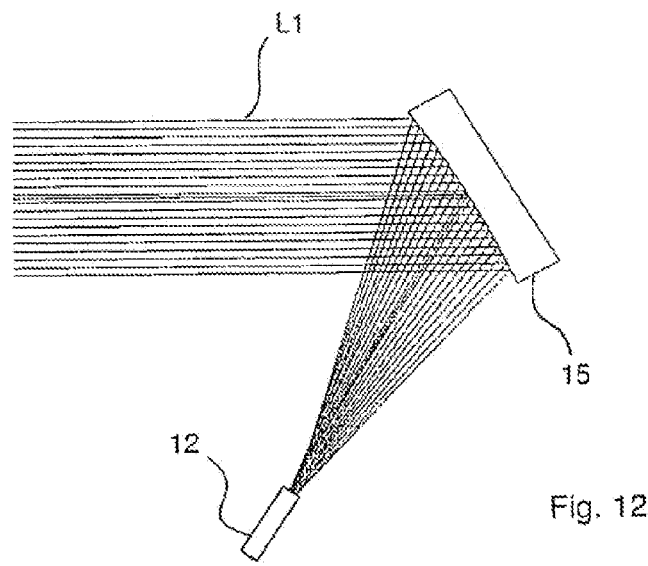
FIG. 12 is a conventional aspherical mirror for comparison with the Fresnel mirrors according to FIG. 10.

In this embodiment example, the following can be given as base surface function of Formula 1: $z_{base\_surface} = 0$. The active surface $z_{effective\_surface}$ can be given in the same way as in Formula 3 above, wherein in particular the linear terms $b_{10}x$ and $b_{01}y$ of the active surface 8 can be integrated into the facets 5 of the Fresnel segments 4 by applying the modulo function, with the result that a tilt of the whole base surface relative to the incident light beam L1 is not necessary. In FIG. 12, for comparison, a conventional spherical mirror 15 is shown which is tilted relative to the direction of incidence of the light beam L1 in order to achieve the same deflecting action that the Fresnel mirror according to FIG. 10 has. Because of the strong tilt, such a mirror 15 has large coma and astigmatism errors which are recognizable in the representation of FIG. 12 from the beam course drawn in. It would be possible to achieve an ideal imaging for a spot with an aspherical formation, not shown, of the mirror 15 if the latter were parabolic. However, a tilt of the mirror according to FIG. 12 would still always be necessary. With the mirror 1 according to the invention in FIG. 10, this tilt is not necessary, as the tilt is integrated in the Fresnel structure 3. Thus, even if there is only installation space for the positioning of the mirror 1 in FIG. 10 available, the desired deflection and focussing action can be achieved with the mirror 1 according to the invention. This would not be possible with a conventional mirror 15 according to FIG. 12.

In the previously described embodiment examples, in each case a flat surface or a plane was assumed as base surface. Of course, it is also possible to provide a base surface differing from this if e.g. the Fresnel structure 3 is to be formed on a spherically curved lens upper surface. In this case, a fine tuning can virtually be carried out by means of the Fresnel structure 3 in the manner that e.g. further aberrations of the lens or the group of lens systems in which the lens is used are corrected.

Figure 13A:
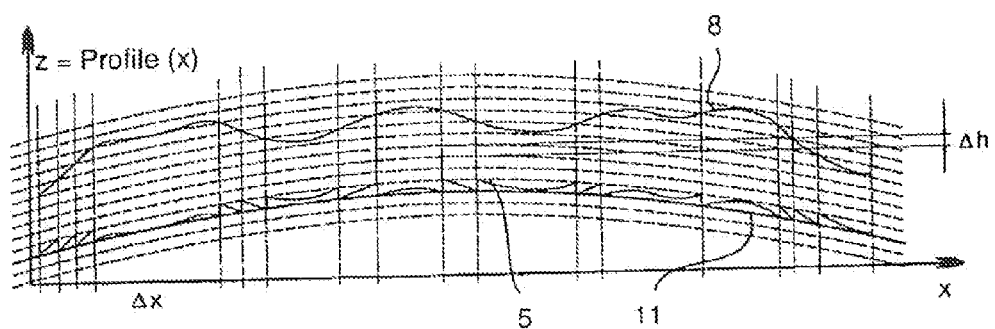
FIG. 13A is a sectional view of a further free-form surface 8 which is effected as a Fresnel structure 3 on a curved base surface 11.

As shown in FIG. 13A, the free-form surface 8 is divided into distances of equal height Δh, wherein the height here is in each case observed relative to the local surface normal of the base surface 11. The distance between the section lines drawn in is thus constant in each case relative to the base surface 11.

Figure 13B:
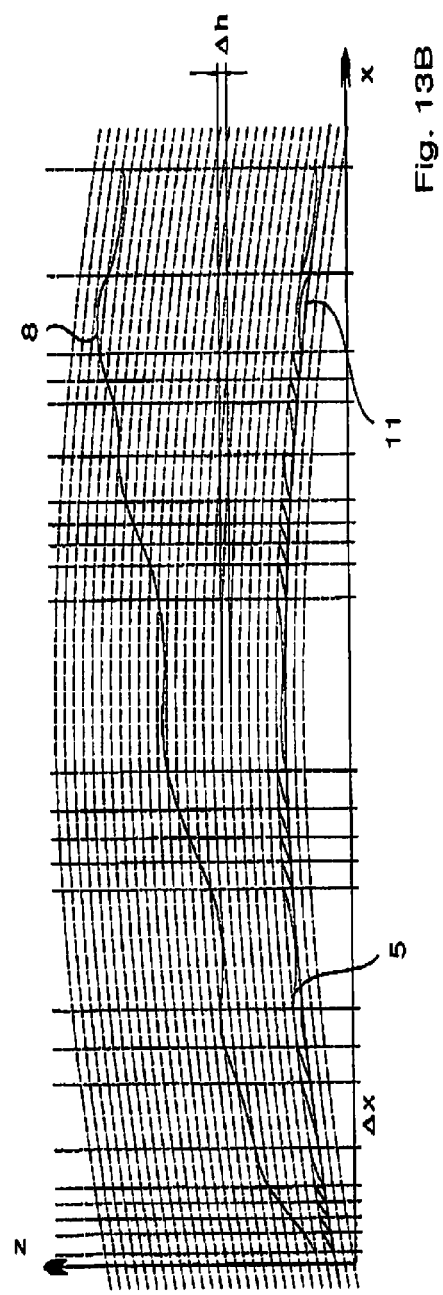
FIG. 13B depicts a further free-form surface 8 which is again implemented on a curved base surface 11 with an optically equivalent action to a Fresnel structure.

An example is shown in FIG. 13B in which the free-form surface 8 is strongly tilted relative to the spherical base surface 11. Also in this case, it is not a problem to form the free-form surface 8 as a Fresnel structure 3 on the base surface 11 without having to change the macroscopic shape of the base surface 11. The height Δh can here, as also in all the other embodiments, lie in the range of 5-500 μm, in an example embodiment in the range of 0.01-0.1 mm and in another example embodiment in the range of from 0.05 to 0.3 mm. Furthermore, the height Δh need not be constant, but can vary here, as also in all the other embodiments. Thus, e.g. Δh can itself increase or decrease as the z-value increases.

Figure 14:
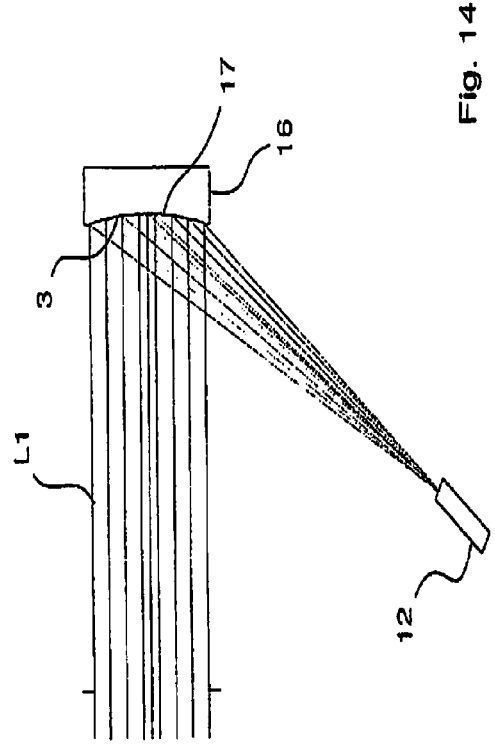
FIG. 14 depicts a reflective Fresnel structure 3 according to a further embodiment on a mirror 16 with spherical base surface 17.

An example is shown in FIG. 14 in which a reflective Fresnel structure 3 is provided on a mirror 16 with spherical base surface 17 in order to achieve a parabolic mirror function. For this, the following formula merely needs to be used in the above formula 1 for the base surface $z_{base\_surface}$ $$z_{base\_surface} = R - sgn(R)\sqrt{R^2 - x^2 - y^2} \quad (8),$$

wherein R is the radius of curvature of the spherical base surface 17, and sgn(R)=1, if R>0 (i.e. convex surface), sgn(R)=−1, if R<0 (i.e. concave surface), sgn(R)=0 for R=0. For the effective surface $z_{effective\_surface}$, the following formula is assumed:

$$z_{effective\_surface} = \sum_{i=0}^{M}\sum_{j=0}^{N}(c_{k(i,j)} \cdot x^i \cdot y^j), \quad (9)$$

wherein k(i,j) is determined as follows:

$$k(i,j) = \frac{(i+j)^2 + i + 3 \cdot j}{2} + 1. \quad (10)$$

0.01 mm was adopted as the depth of the Fresnel structure 3 or crimping in z-direction and thus for the value Δh. Furthermore, M=8 and N=8 were used. The following Fresnel polynomial coefficients thus result.

| i | j | k | Value |
|---|---|---|---|
| 1 | 0 | 2 | −5.0000E-01 |
| 2 | 1 | 8 | −2.0725E-06 |
| 2 | 2 | 13 | 5.1285E-07 |
| 2 | 0 | 4 | 5.1661E-03 |
| 0 | 2 | 8 | 8.1971E-03 |
| 0 | 3 | 10 | −2.7623E-06 |
| 4 | 0 | 11 | 1.7796E-05 |
| 0 | 5 | 21 | 7.0842E-04 |

All unnamed coefficients k(i,j) which are not listed in the above table are equal to 0. The radius R of the spherical mirror is (−)50 mm here.

The allocation between the indices i, j, k can also be given by the following matrix:

$$\begin{pmatrix} 1 & 3 & 6 & 10 & 15 & 21 \\ 2 & 5 & 9 & 14 & 20 & 27 \\ 4 & 8 & 13 & 19 & 26 & 34 \\ 7 & 12 & 18 & 25 & 33 & 42 \\ 11 & 17 & 24 & 32 & 41 & 51 \\ 16 & 23 & 31 & 40 & 50 & 61 \end{pmatrix}, \quad (11)$$

wherein j runs horizontally from 0-5 and i perpendicularly from 0-5 and the allocated matrix values give the corresponding k-index value.

Figure 15:
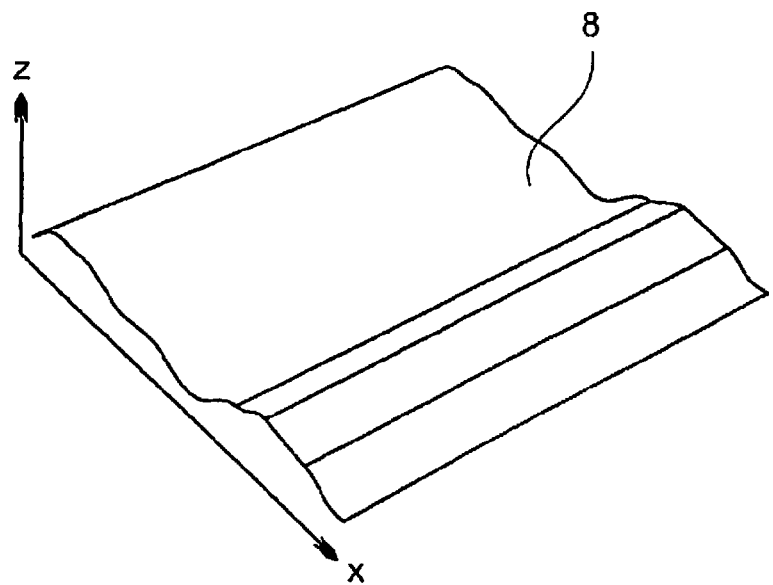
FIG. 15 is a perspective view of a further free-form surface 8.
Figure 16:
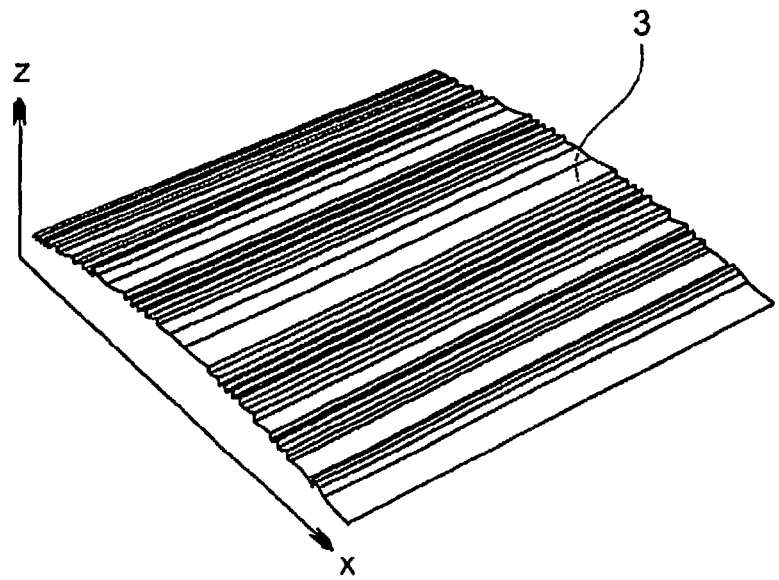
FIG. 16 is a perspective view of the corresponding Fresnel structure of the active surface 8 from FIG. 15 on a cylindrical base surface.

In FIG. 15, an effective surface 8 varying only with x and not with y is shown in perspective. In FIG. 16, the corresponding Fresnel structure 3 is shown on a base surface which is formed as a cylindrical surface. Here too, the effective surface 8 is thus optically converted into a Fresnel structure 3 formed on a base surface that is not level (here a cylindrical surface). The Fresnel structure 3 from FIG. 16 can be formed reflective or transmissive.

Figure 17:
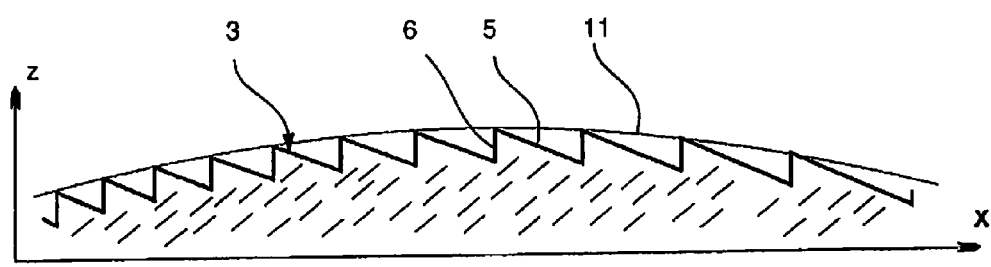
FIGS. 17-18 are sectional views of a Fresnel structure 3 at a curved base surface 11.

In FIG. 17, a sectional view of a Fresnel structure 3 at a curved base surface 11 is shown in which the facets 5 are each formed linear. The individual edges 6 are aligned parallel to each other, wherein the original course of the base surface 11 is also drawn in schematically. In this embodiment, in a variant of Formula 1 the facet function $z_{facet}$ has been deducted from the base surface function $z_{base\_surface}$ with the result that the Fresnel structure 3 can be described as follows:

$$z_F = z_{base\_surface} - z_{facet} \quad (12).$$

This way of calculating $z_F$ is of course also possible in all the already described embodiments as well as in all the embodiments still to follow.

Figure 18:
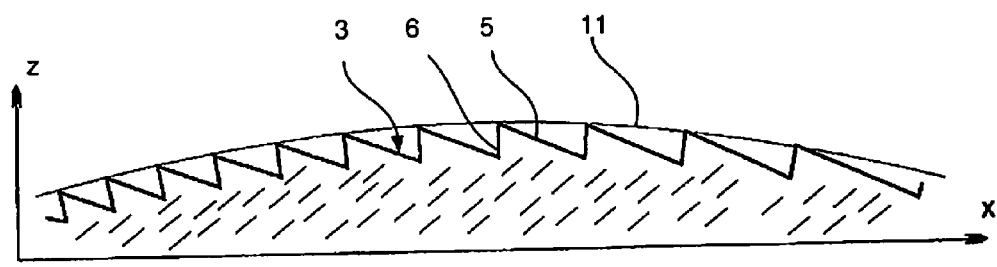

In FIG. 18, a variant of the profile from FIG. 17 is shown which differs essentially in that the edges 6 are no longer oriented parallel to each other in cross-section, but radially relative to the centre, not shown, of the base surface 11.

A Fresnel structure 3 shown according to FIG. 17 or FIG. 18 can be provided as a deflecting element 38 on the front 28 of a multifunction glass 1, wherein the facets 5 are preferably metallized in this case. The multifunction glass 1 is represented schematically in FIG. 19A, wherein the profile shape according to FIG. 17 or 18 corresponds to the sectional view along the section line B-B. At the back 36 of the multifunction glass 1 or spaced apart from the back 36, an imaging system 25 is provided which generates an image which is to be presented to a user, as is described in more detail below, superimposed on the surroundings.

Because of the arrangement of the imaging system 25, an image ray beam BS enters the multifunction glass 1 via the back 36 and strikes the Fresnel structure of the deflecting element 38 which brings about a deflection of the image ray beam BS to the left, with the result that the image ray beam BS is guided in the multifunction glass 1 on the basis of total internal reflection at the back 36 as well as at the front 28 to a superimposition area 29 in which the image ray beam BS is superimposed on the surrounding radiance US to form a common ray beam GS. The superimposition takes place such that, in a pupil area P, the image generated by means of the imaging system 25 is perceptible for a user superimposed on the surroundings.

Figure 19A:
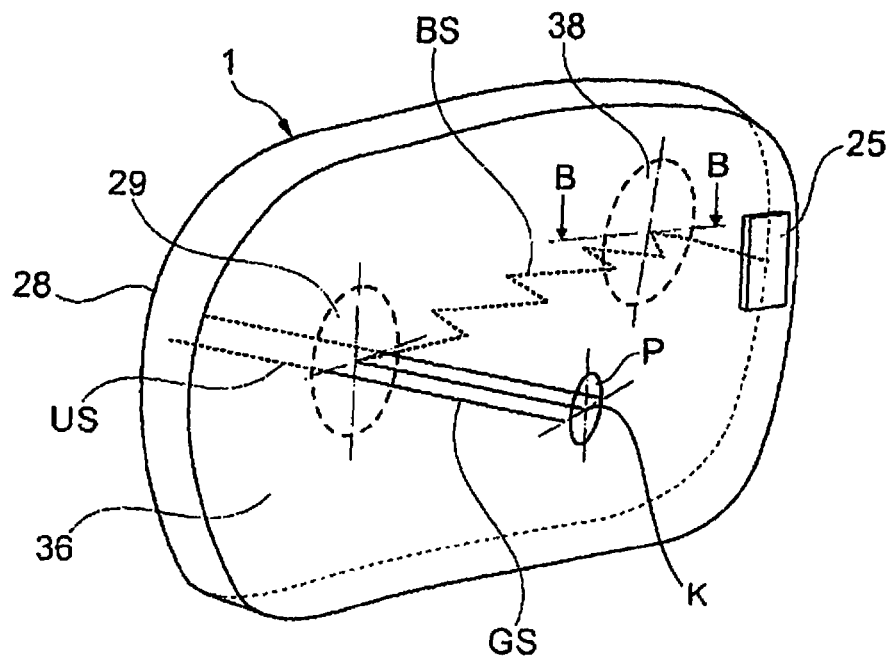
FIG. 19A is a perspective view of a multifunction glass with a deflecting element 38 which contains a Fresnel structure 3 according to the invention.
Figure 19B:
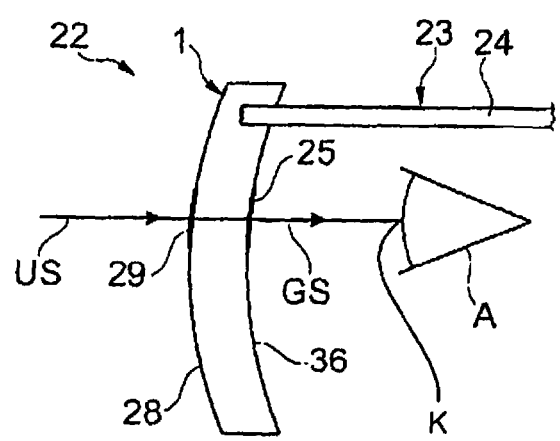
FIG. 19B is a schematic side view of the multifunction glass 1 from FIG. 19A attached to an eyeglass frame 23.

As can be seen from the schematic side view in FIG. 19B, the multifunction glass 1 can be attached to an eyeglass frame 23 which has side arms 24. A thus-formed display device 22 can be fitted in the style of eyeglasses, wherein in this case the eye of the user A lies in the pupil area P, with the result that when the display device 22 is fitted the user can perceive the image generated by means of the imaging system 25 superimposed on the surroundings.

Figure 20A:
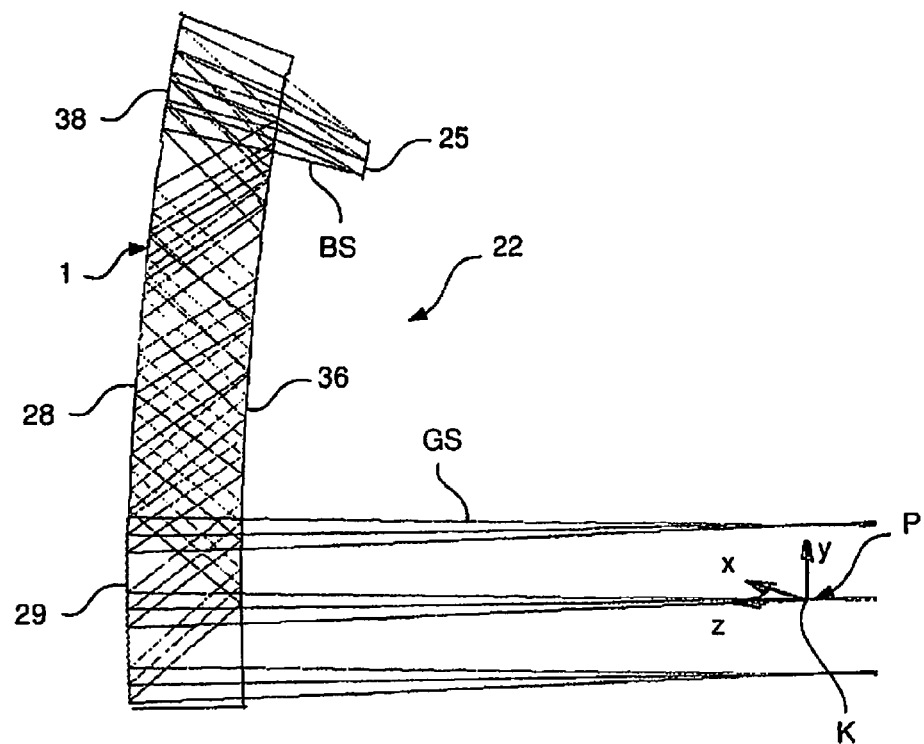
FIG. 20A is a schematic side view of a further embodiment of the display device according to the invention.
Figure 20B:
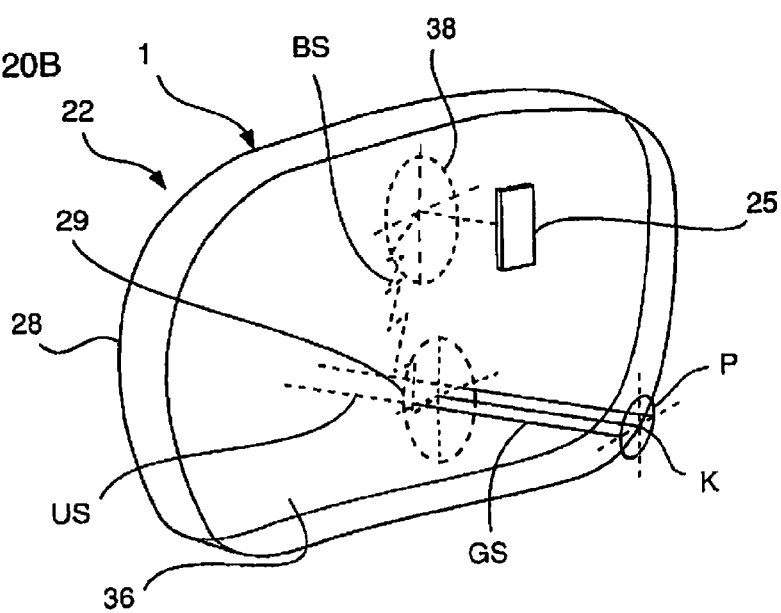
FIG. 20B is a perspective representation of the display device from FIG. 20A.

In FIG. 20A, a schematic side view of a further embodiment of the display device 22 according to the invention is shown, wherein only the multifunction glass 1, the imaging system 25, the eye position K and some examples of beam courses for the image ray beam BS and the common ray beam GS are drawn in. The remaining elements, such as e.g. the eyeglass frame and the surrounding radiance US are not drawn in, to simplify the representation. In FIG. 20B, the corresponding perspective view of the display device 22 from FIG. 20A is represented.

As can be seen from the representation in FIGS. 20A and 20B, unlike in the embodiment from FIGS. 19A and 19B, the deflecting element 38 is no longer arranged next to the superimposition area 29, but above the superimposition area 9.

The deflecting element 38 here is a coupling-in section or area via which the image of the imaging system 25 is coupled into the multifunction glass 1 such that the image ray beam BS is guided to the superimposition or coupling-out section 29 by means of total internal reflections. For this, the deflecting element brings about a folding of the beam path and has an imaging property.

The multifunction glass 1 has a spherically curved, convex front 8 with a radius of 143.5 mm as well as a spherically curved, concave back 36 with a radius of curvature of 140.0 mm, wherein the thickness of the eyeglass lens is 3.5 mm and PMMA was used as material for the eyeglass lens.

The Fresnel structure of the deflecting element 38 can be given in the same way as the reflective Fresnel structure 3 on the mirror 16 with spherical base surface 17 according to FIG. 14 and Formulae 8 to 10. The depth of the Fresnel structure 3 or the Fresnel crimping in z-direction and thus the value for $\Delta h$ here is 0.1 mm and the Fresnel polynomial coefficients read as follows:

| i | j | k | Value |
|---|---|---|---|
| 0 | 1 | 2 | 1.978676e+000 |
| 0 | 2 | 5 | −1.683682e−001 |
| 0 | 3 | 9 | 6.583886e−003 |
| 0 | 4 | 14 | −1.592897e−004 |
| 0 | 5 | 20 | 1.673948e−006 |
| 2 | 0 | 3 | −1.260064e−002 |
| 2 | 1 | 7 | −1.594787e−004 |
| 2 | 2 | 12 | 5.047552e−005 |
| 2 | 3 | 18 | −1.124591e−006 |
| 2 | 4 | 25 | −3.539047e−008 |
| 2 | 5 | 33 | 6.224301e−010 |
| 4 | 0 | 10 | 2.326468e−004 |
| 4 | 1 | 16 | −2.256722e−005 |
| 4 | 3 | 31 | 2.658107e−008 |

All unnamed coefficients k(i,j) which are not listed in the above table are equal to 0.

The Fresnel structure for the coupling-out section or area 29 can also be described by means of Formulae 8 to 10. The corresponding Fresnel polynomial coefficients are given in the following table, wherein again all unnamed coefficients k(i,j) which are not listed in the table are equal to 0.

| i | j | k | Value |
|---|---|---|---|
| 0 | 1 | 2 | 3.889550e−001 |
| 0 | 2 | 5 | −3.833425e−003 |
| 0 | 3 | 9 | −2.736702e−007 |
| 0 | 4 | 14 | 1.935143e−006 |
| 0 | 5 | 20 | 9.627233e−007 |
| 2 | 0 | 3 | −5.487613e−003 |
| 2 | 1 | 7 | 5.506765e−005 |
| 2 | 2 | 12 | 1.146413e−006 |
| 2 | 3 | 18 | 2.124906e−006 |
| 2 | 4 | 25 | −7.838697e−008 |
| 2 | 5 | 33 | −7.841081e−008 |
| 4 | 0 | 10 | 4.996870e−008 |
| 4 | 1 | 16 | −5.316581e−007 |
| 4 | 3 | 31 | −2.683089e−008 |

Also in the case of the Fresnel structure of the coupling-out section 29, $\Delta h$ is equal to 0.1 mm.

The position of the optical surfaces in the overall coordinate system of the pupil P of the eye A (the point of origin is at K) can be given as follows by reference to the direction of the coordinates x, y and z in FIG. 20A in each case relative to the surface in the immediately preceding row (the coordinates x, y and z drawn in FIG. 20A relate to the coordinate system of the pupil P which is used only for the description of the Fresnel structures of the coupling-in section 38 and the coupling-out section 29 in connection with FIGS. 20A and 20B):

| Surface | x-coordinate [mm] | z-coordinate [mm] | Tilt angle about x-axis (°) |
|---|---|---|---|
| P | 0.000 | 0.000 | 0.000 |
| 29 | 0.000 | 21.500 | 0.000 |
| 38 | 0.000 | 0.000 | 0.000 |
| 25 | 0.000 | 16.828 | 14.042 |

In the case of the coupling-in and coupling-out sections 38 and 29, the position of the coordinate system is given, with regard to which the Fresnel surface is defined in the manner given above. In each case, values of 0 are therefore given for the surface 38, as the coordinate systems for the surfaces 29 and 38 coincide. The position and size of the used aperture surface of the respective Fresnel surface, which corresponds to the coupling-in section 38 and to the coupling-out section 29, are as follows with regard to the coordinate system peculiar to the surface:

| Element | x-coordinate [mm] | y-coordinate [mm] | APX [mm] | APY [mm] |
|---|---|---|---|---|
| 29 | 0.000 | 0.000 | 14.5 | 7.1 |
| 38 | 0.000 | 19.87 | 11.6 | 4.8 |

In this table, the width of the Fresnel structure in x-direction is given in the APX column and the width of the Fresnel structure in y-direction in the APY column. Furthermore, the distance of the coupling-out section 38 from the coupling-in section 29 is given. The distance from the eye pupil P to the eyeglass lens (back 38) here is 18 mm, wherein the field of vision is 20×4 for a diameter of 6 mm.

Figure 20C:
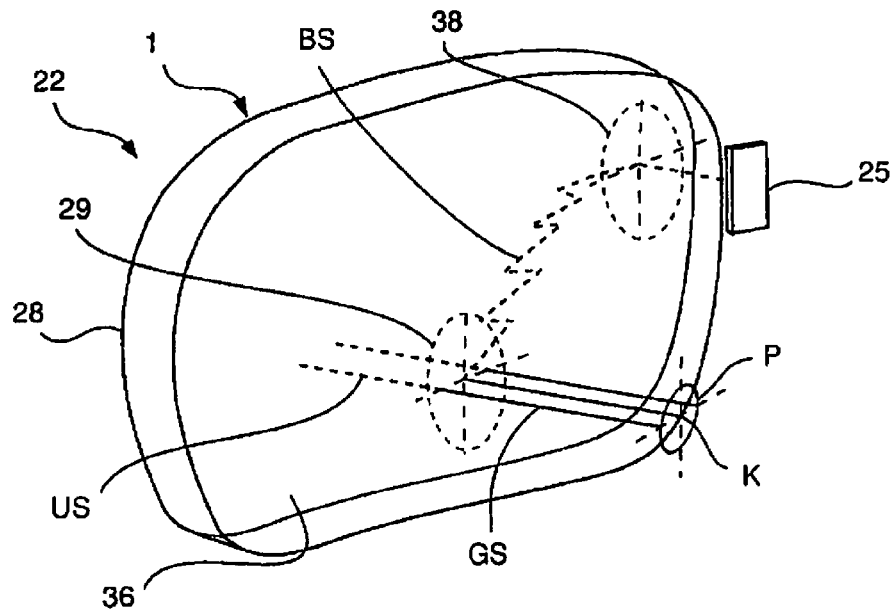
FIG. 20C is a perspective representation of a display device according to a further embodiment.
Figure 20D:
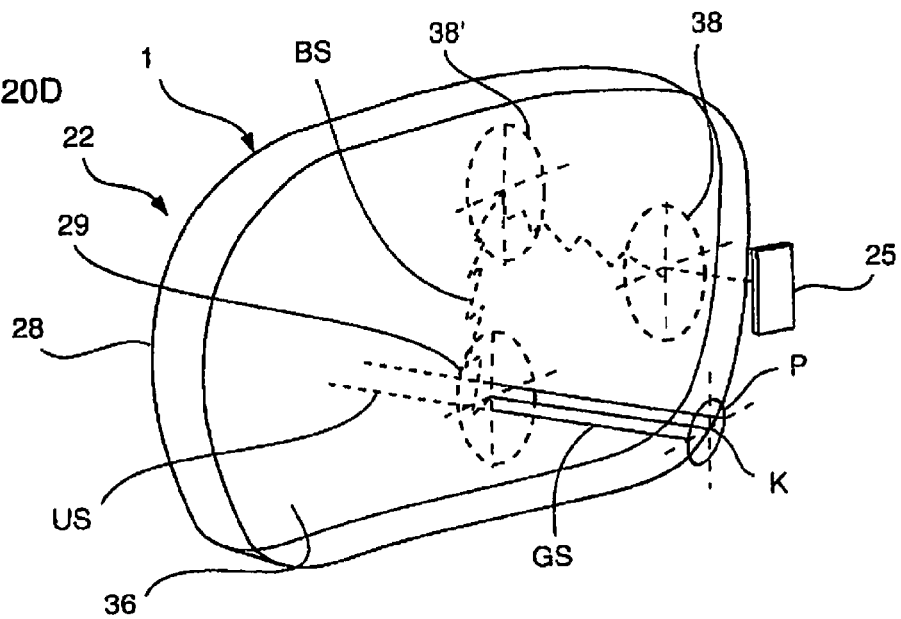
FIG. 20D is a perspective representation of a display device according to a further embodiment.
Figure 20E:
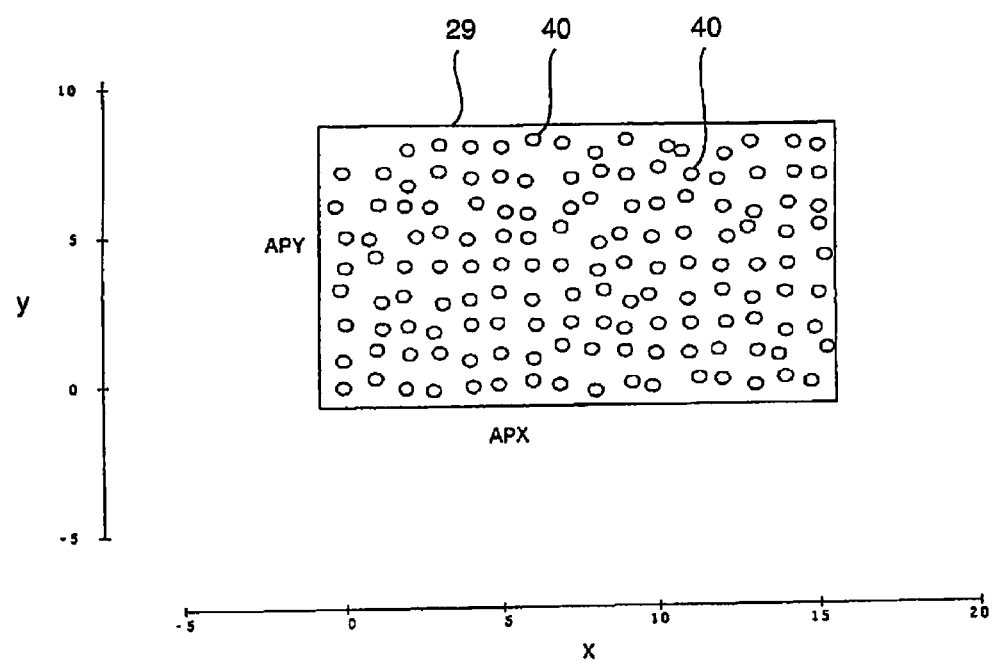
FIG. 20E is a top view of the superimposition area 29 of the multifunction glass 1 from FIGS. 19A and 20A.

Variants of the display device 22 according to FIGS. 20A and 20B are shown in FIGS. 20C and 20D. In the embodiment from FIG. 20C, the coupling-in section 38 is offset both laterally and vertically to the coupling-out section 29. In the embodiment from FIG. 20D, a deflecting section 38' which can be formed in the same way as the coupling-in section 38 as a Fresnel structure (here as a reflective Fresnel structure) is formed on the front 28 between the coupling-in section and the coupling-out section 38 and 29. In particular, the deflecting section 38' can, in addition to the folding of the beam path brought about by it, also have an imaging property.

The formation of the coupling-in and coupling-out sections 38, 29 as well as optionally the deflecting section 38' on the same side of the multifunction glass 1 (here on the front 28) facilitates the production of the multifunction glass 1.

Figure 21:
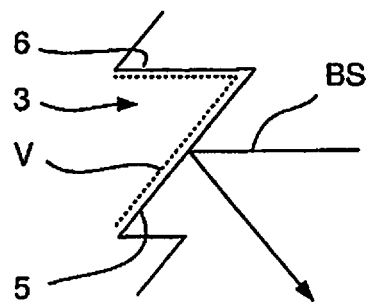
FIG. 21 is a sectional view of an entire facet 5 of the Fresnel structure 3 of the deflecting element 38 from FIG. 19A.

In FIG. 21, a sectional view of an entire facet 5 of the Fresnel structure 3 of the deflecting element 38 is shown. As can be seen from the representation, the facet 5 has a metallization V, in order that the desired deflection of beams of the image ray beam BS takes place.

Figure 22:
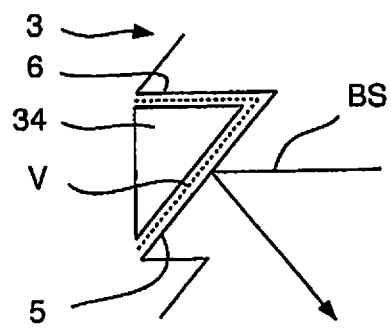
FIG. 22 is a variant of the facet from FIG. 21.

In FIG. 22, a variant is shown in which free areas which are formed due to the incline of the facet 5 relative to the front 28 of the multifunction glass 1 are filled to the front 28 with material 34. The filling is preferably carried out such that a smooth, continuous front 28 is formed. In particular, the same material as for the multifunction glass 1 itself can be used as material 34.

Figure 23:
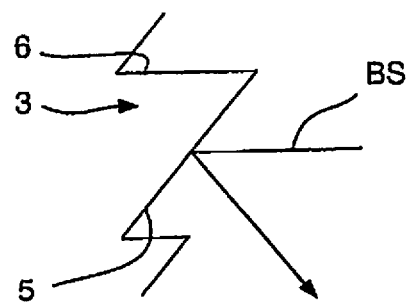
FIG. 23 is a further variant of the facet from FIG. 21.

However, it is also possible to design the Fresnel structure 3 such that the deflection of the image ray beam BS takes place by total internal reflection, with the result that a metallization is no longer necessary, as is indicated in FIG. 23.

Figure 24:
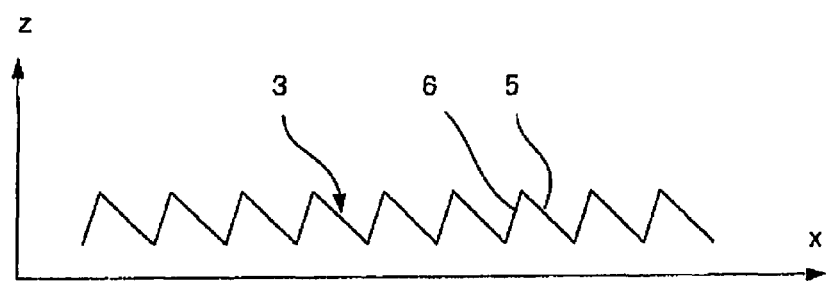
FIG. 24 is a sectional view of a further Fresnel structure 3.

A sectional view of a further Fresnel structure 3 is shown in FIG. 24. In this Fresnel structure 3, the edges 6 do not extend perpendicularly (thus here in z-direction), as in most of the previously described embodiments, but are likewise somewhat inclined. This simplifies the manufacture of the Fresnel structure 3. However, it is preferred if the incline angle of the edges 6 is as small as possible, with the result that they run virtually perpendicularly.

All Fresnel structures 3 described thus far have been continuous Fresnel structures. By this is meant that the individual Fresnel facets 5 are always connected to each other by the edges 6. However, it is also possible to provide the Fresnel facets 5 spaced apart from each other and insert sections 23, which can for example be sections of the base surface 11, between the individual Fresnel facets 5. This can easily be realized by replacing areas or sections of the determined Fresnel surface $z_F$ with the course of the base surface $z_{base\_surface}$ in these sections. A profile of such a Fresnel structure 3 is indicated schematically in FIG. 25.

Figure 26:
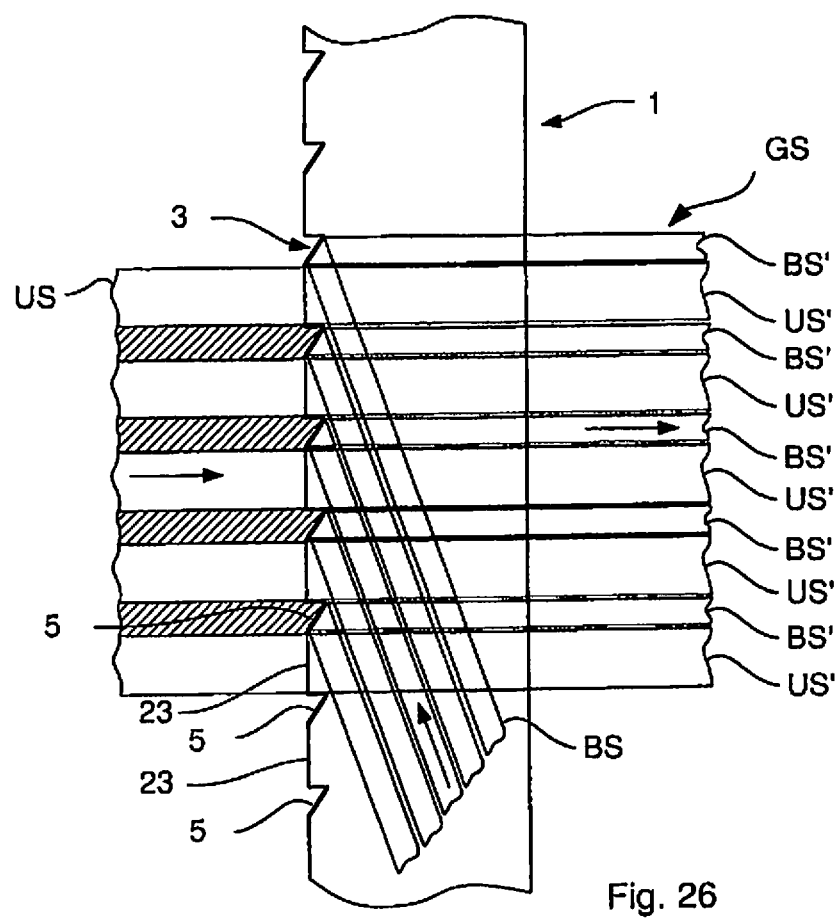
FIG. 26 is a sectional view of a beam combiner 1 with a Fresnel structure 3.

If the Fresnel facets 5 are metallized, a beam combiner 1 for example can be provided in this way, such as is represented in an enlarged sectional view in FIG. 26. With the beam combiner 1, a first ray beam BS can be superimposed on a second ray beam US to form a common ray beam GS. As can be seen from the representation in FIG. 26, the Fresnel facets 5 are tilted relative to the normals of the front 28 such that the part of the first ray beam BS (also called image ray beam BS) which strikes the respective Fresnel facet 5 is reflected to the right as an image partial beam BS'. The remaining part of the image ray beam BS which does not strike the Fresnel facets 5 is reflected and/or transmitted at the front 28 such that it does not become part of the common ray beam GS.

The part of the surrounding ray beam US which strikes the back of the Fresnel facets 5 (from the left in FIG. 26) is screened by the Fresnel facets such that it does not become part of the common ray beam GS. This part of the surrounding ray beam US is therefore drawn in hatched. The remaining part of the surrounding ray beam US passes as surrounding partial beams US' through the transmissive areas 23 between the Fresnel facets 5.

The discontinuous Fresnel structure 3 according to FIG. 26 thus brings about a superimposition of the part US' of the surrounding ray beam US passing through the transmissive areas 23 with the part BS' of the image ray beam BS reflected at the Fresnel facets 5 to form a common ray beam GS.

The superimposition area 29 of the multifunction glass 1 from FIG. 19A as well as the superimposition area 29 of the multifunction glass 1 from FIGS. 20A, 20C and 20D can each be realized in the manner of the beam combiner according to FIG. 26.

For this, the Fresnel segments are preferably formed (as reflective Fresnel segments) e.g. in circular sectors 40, such as is shown in the schematic top view on the, for example rectangular, superimposition area 29 in FIG. 20B. In the areas in-between, the spherical spectacle lens is preserved, with the result that these represent normal light-passage areas.

In order to prevent a regular arrangement or structure of the Fresnel sections, these can e.g. be arranged as follows. Circular areas are fixed, the diameter of which can be determined as follows:

$$D=\sqrt{(100-T)/100/\pi} \cdot 2 \cdot APX/N$$

Wherein T is the required transmission for the surrounding light in percent, N the number of the circles in x-direction and APX the aperture width in x-direction. The circles are initially arranged equidistant in a fixed grid with a grid spacing APX/N in x and y. The positions of the centres of the circles are then easily modified, by dicing the direction and length of the displacement of the centres. The length is chosen here such that no overlapping effect occurs between neighbouring circles.

The following formulae can be applied as statistical functions for length and angle.

Statistical Displacement Length:

$$r=(APX/N/2-D/2) \cdot randf$$

Statistical Displacement Direction:

$$w=360 \cdot randf$$

wherein randf provides a random value between 0 and 1. The modified position of the circles 40 then results according to the following formulae:

$$x=(i/N) \cdot APX+r \cdot \cos(w)$$

$$y=(j/N) \cdot APX+r \cdot \sin(w)$$

$$M=\text{round}(APY/APX)$$

wherein the round function rounds the criterion (APY/APX) up to whole numbers.

Of course, any other type of distribution of the Fresnel structure can also be chosen, wherein an irregular arrangement is preferably chosen.

Of course, the beam combiner from FIG. 26 can also be used as a beam splitter. In this case, it must be impinged on only from the right (thus in the opposite direction to the common ray beam GS drawn in) by a ray beam which is then divided into a transmitted ray beam (which runs contrary to the surrounding ray beam US drawn in, but does not contain the hatched areas) and a reflected ray beam (which runs contrary to the image ray beam BS drawn in).

Figure 27:
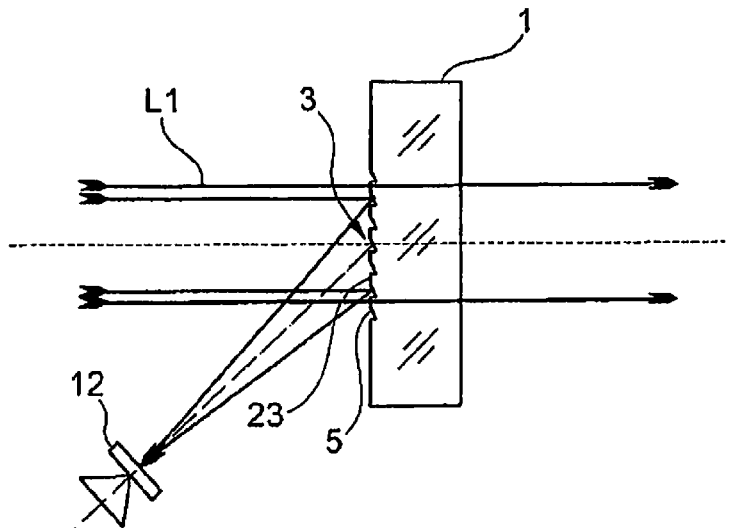
FIG. 27 is a variant of the beam splitter from FIG. 26.

A variant of the beam splitter from FIG. 26 is shown in FIG. 27. In this variant, again only the facets 5 of the Fresnel structure 3 and not the areas 23 are coated, with the result that the part of the incident light beam L1 which strikes the facets 5 is reflected and the other part, which strikes the areas 23, is transmitted. Furthermore, the reflected ray beam is focussed onto the detector 12.

Figure 28:
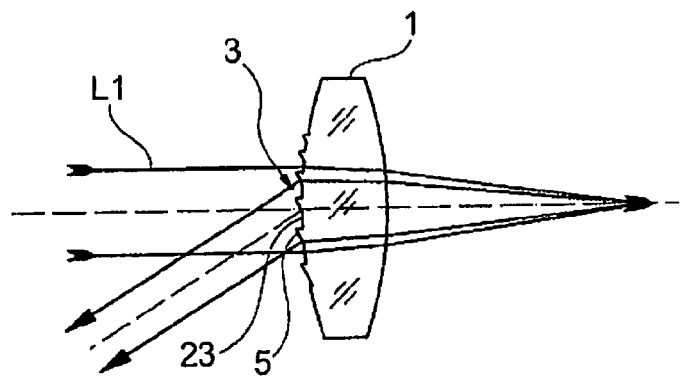
FIG. 28 is a variant of the beam splitter from FIG. 27.

A variant is shown in FIG. 28 in which the base surface of the beam splitter 1 from FIG. 27 is curved, with the result that the transmitted part of the incident light beam L1 is also focussed, as can be seen from the representation.

Figure 29:
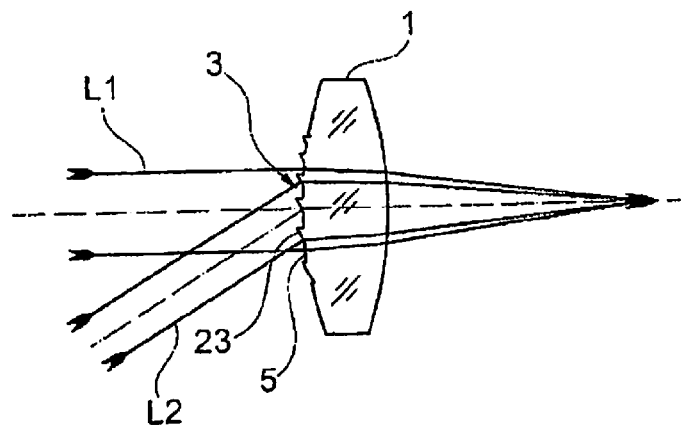
FIG. 29 is a beam combiner with a Fresnel structure.
Figure 30:
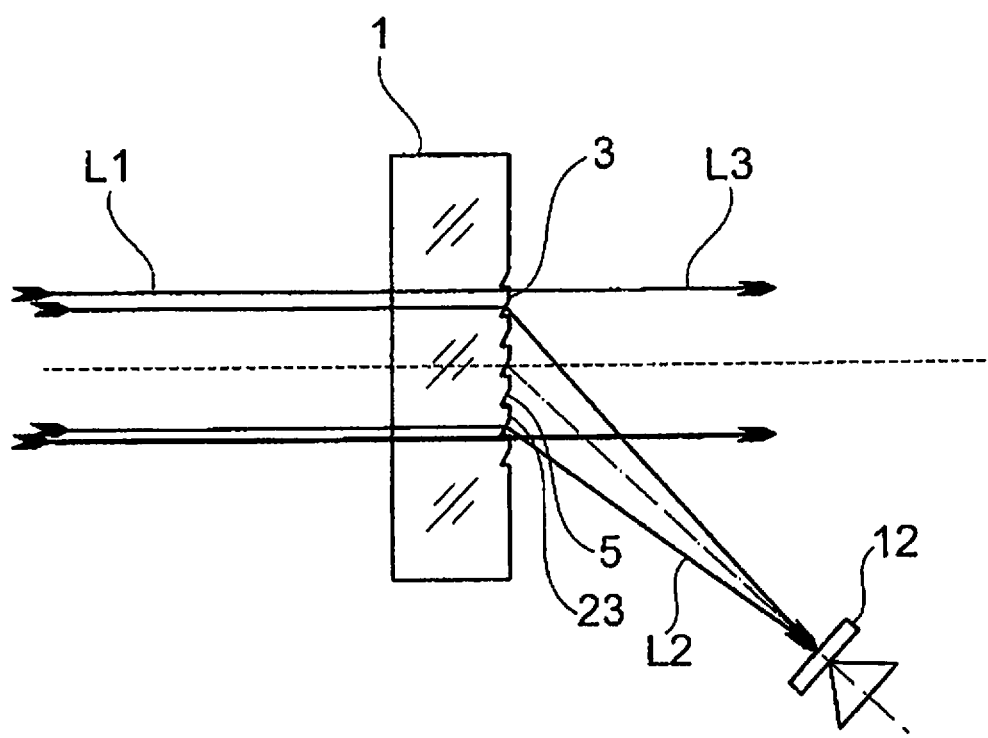
FIG. 30 is a further embodiment of a beam splitter with a Fresnel structure 3.

In FIG. 29, the optical element 1 is formed as a beam combiner in which a first and a second ray beam L1 and L2 are superimposed because of the Fresnel structure 3 to form a common ray beam which in addition is also focussed, as can be seen from the representation. An optical element 1 which is formed as a beam splitter is shown in FIG. 30, wherein the Fresnel structure 3 acts transmissively. The Fresnel structure 3 is formed such that a part of the incident ray beam L1 is deflected and simultaneously focussed onto a detector 12 as ray beam L2. The rest of the incident ray beam L1 passes through the element 1 as transmitted ray beam L3.

Figure 25:
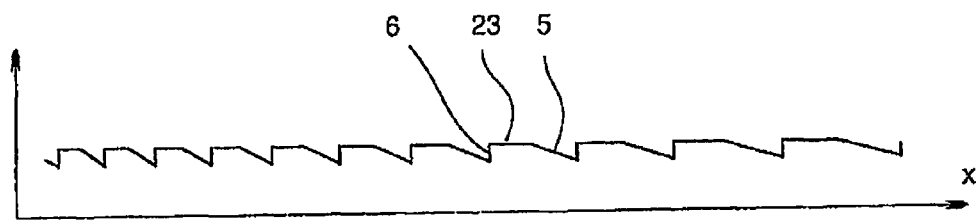
FIG. 25 is a sectional view of a discontinuous Fresnel structure 3.

In the versions in FIGS. 27 to 30, the Fresnel structures 3 can be continuous, or it is also possible that intermediate areas 23 are provided, in the same way as was described in FIGS. 25 and 26.

The invention claimed is:

1. A method for producing a multifunction optical element for a display device, the display device comprising an image-generating module which generates an image, the method comprising:
forming the multifunction optical element with a coupling-in area and a coupling-out area, the coupling-in area being located separately from the coupling-out area, wherein a structure of the multifunction optical element is such that the image generated by the image-generating module that is coupled into the multifunction optical element via the coupling-in area, is guided in the multifunction optical element along a folded optical path by multiple total internal reflections from the coupling-in area to the coupling-out area and coupled out via the coupling-out area such that a user can perceive a coupled-out image superimposed on surroundings;
wherein the coupling-out area is formed with a Fresnel structure having an imaging property and which receives light via the folded optical path from the coupling-in area and couples the image out of the multifunction optical element by forming the Fresnel structure to have several Fresnel segments and forming optically effective facets of the Fresnel segments such that the optically effective facets optically correspond to an imaginary optically effective surface which is curved.

2. The method according to claim 1, further comprising forming the Fresnel structure such that the Fresnel structure presents facets defining cavities and applying a filling material to the Fresnel structure such that the cavities are filled by the filling material and the Fresnel structure together with the filling material presents a smooth continuous surface.

3. The method according to claim 2, further comprising forming a bulk of the multifunction optical element and the filling material from similar material.

4. The method according to claim 1, further comprising forming the Fresnel structure to be at least partially reflective.

5. The method according to claim 4, further comprising forming the Fresnel structure to include a coating that is at least partially reflective.

6. The method according to claim 3, further comprising forming the Fresnel structure as a continuous Fresnel structure.

7. The method according to claim 1, further comprising forming the Fresnel structure at a material boundary surface of the multifunction optical element.

8. The method according to claim 1, further comprising forming optically effective facets of the Fresnel segments to optically correspond to an imaginary optical effective surface which is curved and has neither mirror symmetry nor rotational symmetry.

9. The method according to claim 1, further comprising forming a shape of the facets as an approximation of a shape of the corresponding surface section of an imaginary effective surface.

10. The method according to claim 1, further comprising forming the Fresnel structure such that the Fresnel structure presents facets having a maximum facet height in the range of 5-500 μm, in the range of 0.01-0.1 mm, in the range of 200-300 μm, or in the range of 0.05-0.3 mm.

11. The method according to claim 1, further comprising forming the Fresnel structure such that the Fresnel structure presents facets having a maximum height, wherein the maximum height of each facet is the same.

12. The method according to claim 1, further comprising producing the multifunction optical element on the basis of production data which are generated computationally by dividing an optical model surface into several height regions and computationally arranging the surface sections of the individual height regions or approximations of these surface sections at a base surface such that they optically correspond to an optical effective surface having said imaging property.

13. The method according to claim 12, further comprising computiatonally arranging the surface sections or the approximation of the surface sections at a curved base section.

14. The method according to claim 12, further comprising computationally optimizing the optical model surface for providing said imaging property.

15. The method according to claim 1, wherein the image is guided in the multifunction optical element along a folded optical path.

16. The method according to claim 1, further comprising forming the Fresnel structure by at least one of diamond milling, moulding and casting.

17. The method according to claim 1, further comprising forming the Fresnel structure as a refractive Fresnel structure.

18. The method according to claim 1, further comprising forming the Fresnel structure such that the Fresnel structure presents facets which are spaced apart from each other.

19. The method according to claim 1, further comprising forming the Fresnel structure such that the Fresnel structure presents facets which are directly neighbouring.

20. The method according to claim 8, further comprising forming the Fresnel structure such that the imaginary optical effective surface has no translation symmetry.

* * * * *

UNITED STATES PATENT AND TRADEMARK OFFICE
CERTIFICATE OF CORRECTION

PATENT NO. : 9,465,218 B2  
APPLICATION NO. : 14/613046  
DATED : October 11, 2016  
INVENTOR(S) : Hans-Juergen Dobschal et al.

Page 1 of 1

It is certified that error appears in the above-identified patent and that said Letters Patent is hereby corrected as shown below:

On the Title Page

Under (73) Assignee: delete "Carl Zeiss AG, Oberkochen (DE)" and insert --Carl Zeiss Smart Optics GmbH, Aalen (DE)--

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*